(12) United States Patent
Nakamura et al.

(10) Patent No.: US 12,043,044 B2
(45) Date of Patent: Jul. 23, 2024

(54) THREE-DIMENSIONAL OBJECT PRINTING APPARATUS AND THREE-DIMENSIONAL OBJECT PRINTING METHOD

(71) Applicant: Seiko Epson Corporation, Tokyo (JP)

(72) Inventors: Shinichi Nakamura, Okaya (JP); Yuta Abe, Sakata (JP); Yuichiro Matsuura, Chino (JP); Yuki Ishii, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 185 days.

(21) Appl. No.: 17/689,107

(22) Filed: Mar. 8, 2022

(65) Prior Publication Data

US 2022/0288846 A1    Sep. 15, 2022

(30) Foreign Application Priority Data

Mar. 9, 2021   (JP) ................. 2021-037082

(51) Int. Cl.
| | | |
|---|---|---|
| *B41J 3/407* | (2006.01) | |
| *B29C 64/106* | (2017.01) | |
| *B29C 64/209* | (2017.01) | |
| *B33Y 10/00* | (2015.01) | |
| *B33Y 30/00* | (2015.01) | |
| *B41J 2/14* | (2006.01) | |
| *B41J 2/165* | (2006.01) | |

(52) U.S. Cl.
CPC ........... *B41J 3/4073* (2013.01); *B29C 64/106* (2017.08); *B29C 64/209* (2017.08); *B33Y 10/00* (2014.12); *B33Y 30/00* (2014.12); *B41J 2/14* (2013.01); *B41J 2/16505* (2013.01); *B41J 2002/16514* (2013.01); *B41J 2/16532* (2013.01)

(58) Field of Classification Search
CPC ...................................... B41J 3/4073
See application file for complete search history.

(56) References Cited

U.S. PATENT DOCUMENTS

| | | | |
|---|---|---|---|
| 6,336,756 B1 * | 1/2002 | Toyama ................... | B41J 19/16 400/279 |
| 2006/0170729 A1 * | 8/2006 | Sloan ...................... | B41J 25/005 347/37 |
| 2007/0252865 A1 * | 11/2007 | Sakurai ................ | B41J 2/16508 347/29 |

(Continued)

FOREIGN PATENT DOCUMENTS

JP         2014-050832 A      3/2014

*Primary Examiner* — Shelby L Fidler
(74) *Attorney, Agent, or Firm* — Harness, Dickey & Pierce, P.L.C.

(57) ABSTRACT

A three-dimensional object printing apparatus includes: a head having a nozzle surface; a robot that has a base portion that supports the head, and changes a position of the head with respect to the base portion; and a cap portion having a fixed position to the base portion to cover the nozzle surface, in which the three-dimensional object printing apparatus is configured to execute: a capping operation of causing the robot to locate the head at a position at which the nozzle surface is covered with the cap portion, and a printing operation of causing the head to eject the liquid to a work with respect to the work, and a yaw angle of the head during the execution of the capping operation and a yaw angle of the head during the execution of the printing operation are different from each other.

19 Claims, 8 Drawing Sheets

(56) References Cited

U.S. PATENT DOCUMENTS

| | | | |
|---|---|---|---|
| 2014/0063096 A1 | 3/2014 | Pitz et al. | |
| 2017/0259432 A1* | 9/2017 | Goerbing | B41J 2/175 |
| 2018/0201029 A1* | 7/2018 | Mathis | B41J 2/01 |
| 2019/0351617 A1* | 11/2019 | Heston | B29C 64/227 |
| 2021/0300061 A1* | 9/2021 | Boniface | B41J 25/308 |
| 2022/0379338 A1* | 12/2022 | Kobayashi | B05C 5/02 |

* cited by examiner

THREE-DIMENSIONAL OBJECT PRINTING APPARATUS AND THREE-DIMENSIONAL OBJECT PRINTING METHOD

The present application is based on, and claims priority from JP Application Serial Number 2021-037082, filed Mar. 9, 2021, the disclosure of which is hereby incorporated by reference herein in its entirety.

BACKGROUND

1. Technical Field

The present disclosure relates to a three-dimensional object printing apparatus and a three-dimensional object printing method.

2. Related Art

A three-dimensional object printing apparatus that performs printing on a surface of a three-dimensional work by an ink jet method is known. For example, an apparatus described in JP-A-2014-050832 includes a robot arm and a print head fixed to a tip of the robot arm.

The printing apparatus described in JP-A-2014-050832 has a problem that an ink in the vicinity of a nozzle of the print head becomes thickened or solidified due to an influence of external light or drying by the outside air, so that the nozzle is clogged, and as a result, an ejection failure occurs.

SUMMARY

According to an aspect of the present disclosure, there is provided a three-dimensional object printing apparatus including: a head having a nozzle surface provided with a plurality of nozzles for ejecting a liquid; a robot that has a base portion and an arm portion that supports the head, is provided with a plurality of rotating portions from the base portion to the arm portion, and changes a position of the head with respect to the base portion by rotating the rotating portion; and a cap portion that covers the nozzle surface, in which the three-dimensional object printing apparatus is configured to execute: a capping operation of causing the robot to locate the head at a position at which the nozzle surface is covered with the cap portion, and a printing operation of causing the head to eject the liquid to a work while causing the robot to change a position of the head with respect to the work to a position different from a position during the execution of the capping operation, and a yaw angle of the head during the execution of the capping operation and a yaw angle of the head during the execution of the printing operation are different from each other.

According to another aspect of the present disclosure, there is provided a three-dimensional object printing method using a head having a nozzle surface provided with a plurality of nozzles for ejecting a liquid, a robot that has a base portion and an arm portion that supports the head, is provided with a plurality of rotating portions from the base portion to the arm portion, and changes a position of the head with respect to the base portion by rotating the rotating portion, and a cap portion that covers the nozzle surface, the method including: performing a capping operation of causing the robot to locate the head at a position at which the nozzle surface is covered with the cap portion; and performing a printing operation of causing the head to eject the liquid to a work while causing the robot to change a position of the head with respect to the work to a position different from a position during the execution of the capping operation, and a yaw angle of the head during the execution of the capping operation and a yaw angle of the head during the execution of the printing operation are different from each other.

DESCRIPTION OF EXEMPLARY EMBODIMENTS

Figure 1:
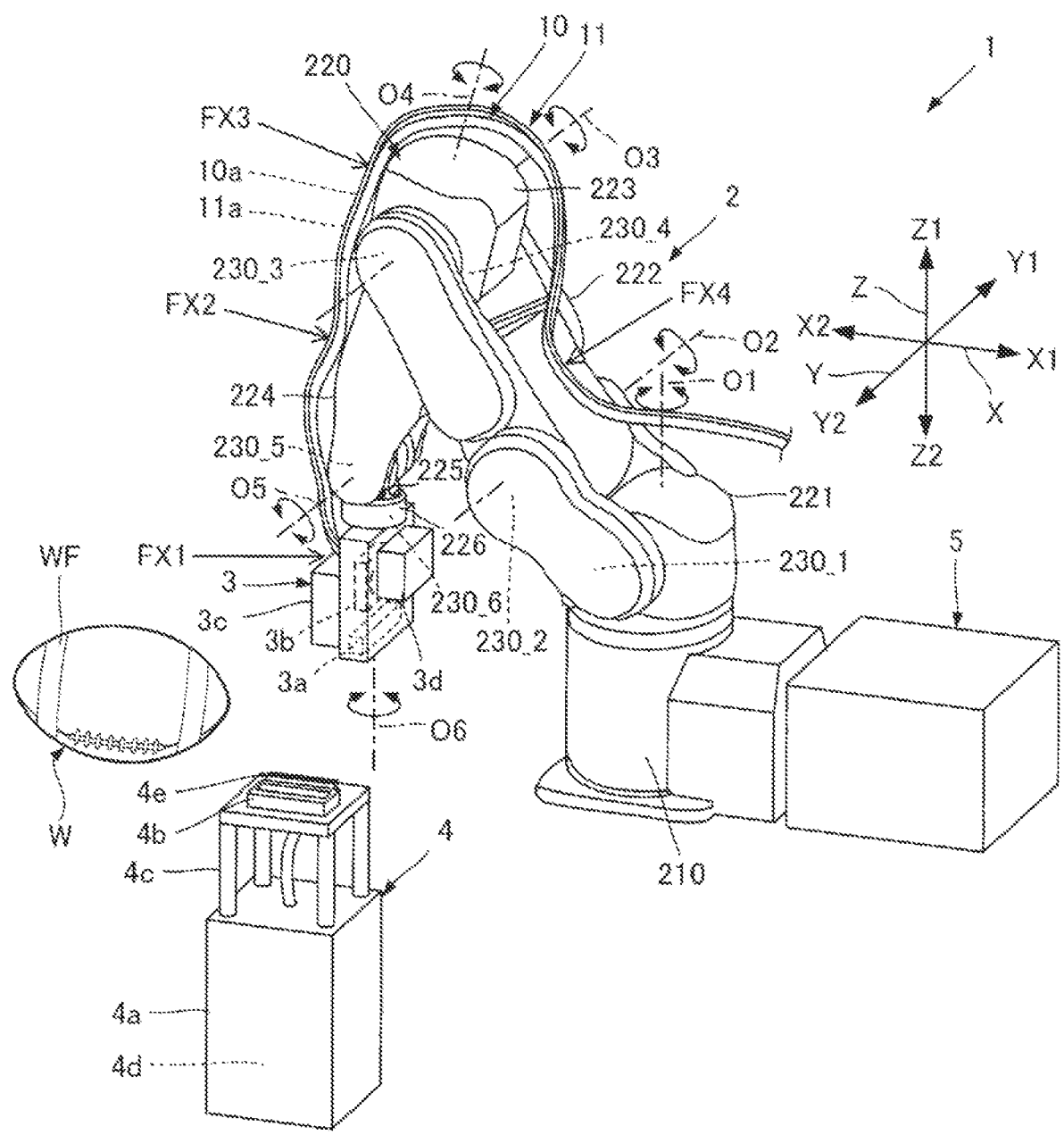
FIG. 1 is a perspective view illustrating an outline of a three-dimensional object printing apparatus according to an embodiment.

Hereinafter, appropriate embodiments of the present disclosure will be described with reference to the accompanying drawings. In the drawings, dimensions and scale of each portion are appropriately different from the actual ones, and some portions are schematically illustrated for easy understanding. In addition, the scope of the present disclosure is not limited thereto unless otherwise stated to limit the present disclosure in the following description.

In the following description, for convenience, an X-axis, a Y-axis, and a Z-axis that intersect each other will be appropriately used. Further, in the following description, one direction along the X-axis is an X1 direction, and a direction opposite to the X1 direction is an X2 direction. In the same manner, directions opposite to each other along the Y-axis are a Y1 direction and a Y2 direction. Further, directions opposite to each other along the Z-axis are a Z1 direction and a Z2 direction.

Here, the X-axis, the Y-axis, and the Z-axis correspond to the coordinate axes of the world coordinate system set in a space in which a robot 2, which will be described below, is installed. Typically, the Z-axis is a vertical axis, and the Z2 direction corresponds to a downward direction in the vertical direction. A base coordinate system using a base portion of the robot 2 as a reference is associated with the world coordinate system by calibration. In the following, for convenience, a case where an operation of the robot 2 is controlled by using the world coordinate system as a robot coordinate system will be illustrated.

The Z-axis may not be the vertical axis. Further, the X-axis, the Y-axis, and the Z-axis are typically orthogonal to each other, but the present disclosure is not limited to this, and the X-axis, the Y-axis, and the Z-axis may not be orthogonal to each other. For example, the X-axis, Y-axis, and Z-axis may intersect each other at an angle within a range equal to or more than 80° and equal to or less than 100°.

1. First Embodiment

1-1. Outline of Three-dimensional Object Printing Apparatus

FIG. 1 is a perspective view illustrating an outline of a three-dimensional object printing apparatus 1 according to an embodiment. The three-dimensional object printing apparatus 1 is an apparatus that performs printing on a surface of a three-dimensional work W by an ink jet method.

The work W has a surface WF as a printing target. In the example illustrated in FIG. 1, the work W is a rugby ball having a long spherical shape, and the surface WF is a curved surface. For example, the work W at a time of printing is supported by a structure such as a predetermined setting table, a robot hand, or a conveyor, as needed. An aspect such as a shape or a size of the work W or the surface WF is not limited to the example illustrated in FIG. 1, and is freely determined. Further, a position or a posture of the work W or the surface WF at the time of printing may be set so that printing is possible, and is freely determined without being limited to the example illustrated in FIG. 1.

As illustrated in FIG. 1, the three-dimensional object printing apparatus 1 includes the robot 2, a head unit 3, a maintenance unit 4, a controller 5, a piping portion 10, and a wiring portion 11. Hereinafter, first, the robot 2, the head unit 3, the maintenance unit 4, the controller 5, the piping portion 10, and the wiring portion 11 will be briefly described in order.

The robot 2 is a robot that changes a position and a posture of the head unit 3 in the world coordinate system. In the example illustrated in FIG. 1, the robot 2 is a so-called 6-axis vertical articulated robot.

As illustrated in FIG. 1, the robot 2 has a base portion 210 and an arm portion 220.

The base portion 210 is a base that supports the arm portion 220. In the example illustrated in FIG. 1, the base portion 210 is fixed to a floor surface or the like facing the Z1 direction or an installation surface such as a base plate by screwing or the like. The installation surface to which the base portion 210 is fixed may be a surface facing in any direction, is not limited to the example illustrated in FIG. 1, and may be, for example, a surface provided by a wall, a ceiling, a movable trolley, or the like. Further, in the following, when viewed in a direction perpendicular to the installation surface of the base portion 210, that is, viewed in the Z1 direction or the Z2 direction in the present embodiment is referred to as a "plan view of the base portion 210" or simply a "plan view", in some cases.

The arm portion 220 is a 6-axis robot arm having a base end attached to the base portion 210 and a tip that changes a position and a posture three-dimensionally with respect to the base end. Specifically, the arm portion 220 has arms 221, 222, 223, 224, 225, and 226, which are coupled in this order.

The arm 221 is rotatably coupled to the base portion 210 around a rotation axis O1 via a joint portion 230_1. The arm 222 is rotatably coupled to the arm 221 around a rotation axis O2 via a joint portion 230_2. The arm 223 is rotatably coupled to the arm 222 around a rotation axis O3 via a joint portion 230_3. The arm 224 is rotatably coupled to the arm 223 around a rotation axis O4 via a joint portion 230_4. The arm 225 is rotatably coupled to the arm 224 around a rotation axis O5 via a joint portion 230_5. The arm 226 is rotatably coupled to the arm 225 around a rotation axis O6 via a joint portion 230_6.

Each of the joint portions 230_1 to 230_6 is an example of a "rotating portion", and is a mechanism for rotatably coupling one of two adjacent members of the base portion 210 and the arms 221 to 226 to the other. Here, among the joint portions 230_1 to 230_6, the joint portion 230_1 which is closest to the base portion 210 is an example of a "first rotating portion". Further, the joint portion 230_6 which is farthest from the base portion 210 among the joint portions 230_1 to 230_6 is an example of a "second rotating portion". In the following, each of the joint portions 230_1 to 230_6 may be referred to as a "joint portion 230".

Although not illustrated in FIG. 1, each of the joint portions 230_1 to 230_6 is provided with a drive mechanism for rotating one of the two adjacent members corresponding to each other to the other. The drive mechanism includes, for example, a motor that generates a drive force for the rotation, a speed reducer that decelerates and outputs the drive force, an encoder such as a rotary encoder that detects a movement amount such as an angle of the rotation, and the like. An aggregation of the drive mechanisms of the joint portions 230_1 to 230_6 corresponds to an arm drive mechanism 2a illustrated in FIG. 2, which will be described below.

The rotation axis O1 is an axis perpendicular to the installation surface (not illustrated) to which the base portion 210 is fixed. The rotation axis O2 is an axis perpendicular to the rotation axis O1. The rotation axis O3 is an axis parallel with the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes that an angle formed by the two rotation axes is strictly 90°, and the angle formed by the two rotation axes deviates within a range of approximately 90° to ±5°. In the same manner, "parallel" includes not only a case where the two rotation axes are strictly parallel with each other, but also a case where one of the two rotation axes is tilted within a range of approximately ±5° with respect to the other.

The head unit 3 is attached to the arm 226 located at the most tip of the arm portion 220 of the above robot 2 in a state of being fixed by screwing or the like, as an end effector.

The head unit 3 is an assembly having a head 3a that ejects an ink, which is an example of a "liquid", toward the work W. In the present embodiment, the head unit 3 includes a pressure regulating valve 3b, a curing light source 3c, and a distance sensor 3d, in addition to the head 3a. Details of the head unit 3 will be described with reference to FIG. 3, which will be described below.

The ink is not particularly limited, and includes, for example, an aqueous ink in which a coloring material such as a dye or a pigment is dissolved in an aqueous solvent, a curable ink using a curable resin such as an ultraviolet curable type, a solvent-based ink in which a coloring material such as a dye or a pigment is dissolved in an organic solvent, and the like. Among the inks, the curable ink is preferably used. The curable ink is not particularly limited, and may be, for example, any of a thermosetting type, a photocurable type, a radiation curable type, an electron beam curable type, or the like, and a photocurable type such as an ultraviolet curable type is preferable. The ink is not limited to the solution, and may be an ink in which a coloring material or the like is dispersed as a dispersant in a dispersion medium. Further, the ink is not limited to an ink containing a coloring material, and may be, for example, an ink containing conductive particles such as metal particles for forming wiring or the like as a dispersant, a clear ink, or a treatment liquid for surface treatment of the work W.

Each of the piping portion 10 and the wiring portion 11 is coupled to the head unit 3. The piping portion 10 is a pipe or a pipe group including a supply pipe 10a that supplies an ink from an ink tank (not illustrated) to the head unit 3. The supply pipe 10a is a flexible pipe body made of, for example, a rubber material or an elastomer material. The wiring portion 11 is a wiring or a wiring group including a drive wiring 11a for supplying an electrical signal for driving the head 3a. The drive wiring 11a is configured with, for example, various flexible electrical wirings. In addition to the supply pipe 10a, the piping portion 10 may include other pipes such as a pipe for transferring the ink ejected from the head unit 3, for example. Further, in addition to the drive wiring 11a, the wiring portion 11 appropriately includes various wirings for transmitting other electronic signals such as a control signal SI, which will be described below, which are necessary for driving the head 3a, for example.

Each of the piping portion 10 and the wiring portion 11 is fixed to the head unit 3 at a fixed position FX1 by being coupled to the head unit 3. The fixed position FX1 is a position in the end effector, specifically, a position of a connector (not illustrated) for coupling the piping portion 10 and the wiring portion 11 to the head unit 3. Further, each of the piping portion 10 and the wiring portion 11 is fixed to the arm portion 220 of the robot 2 described above by a binding band or the like at fixed positions FX2, FX3, and FX4. The fixed position FX2 is a position on the arm 224 described above. The fixed position FX3 is a position on the arm 223 described above. The fixed position FX4 is a position on the arm 222 described above. By partially fixing the piping portion 10 and the wiring portion 11 to a plurality of positions of the arm portion 220 in this manner, a positional relationship between the arm portion 220, the piping portion 10, and the wiring portion 11 can be maintained within a predetermined range while sufficiently allowing a movement of the arm portion 220. The example in FIG. 1 includes a configuration in which routing routes of the piping portion 10 and the wiring portion 11 are identical to each other, and the routing routes of the piping portion 10 and the wiring portion 11 may have portions different from each other.

The maintenance unit 4 is a mechanism for performing maintenance on the head 3a of the head unit 3. In the example illustrated in FIG. 1, the maintenance unit 4 has a case 4a, a cap portion 4b, a support table 4c, a suction mechanism 4d, and a wiper portion 4e. In the same manner as the base portion 210 of the robot 2, the case 4a is fixed to a floor surface or the like facing the Z1 direction or an installation surface such as a base plate by screwing or the like. Details of the maintenance unit 4 will be described with reference to FIG. 3, which will be described below. Further, the maintenance is a concept including covering the nozzle surface F of the head 3a with the cap portion 4b, performing suction by the suction mechanism 4d, wiping with the wiper portion 4e, and the like.

The controller 5 is a robot controller that controls a drive of the robot 2. Hereinafter, an electrical configuration of the three-dimensional object printing apparatus 1 will be described with reference to FIG. 2, including a detailed description of the controller 5.

Figure 2:
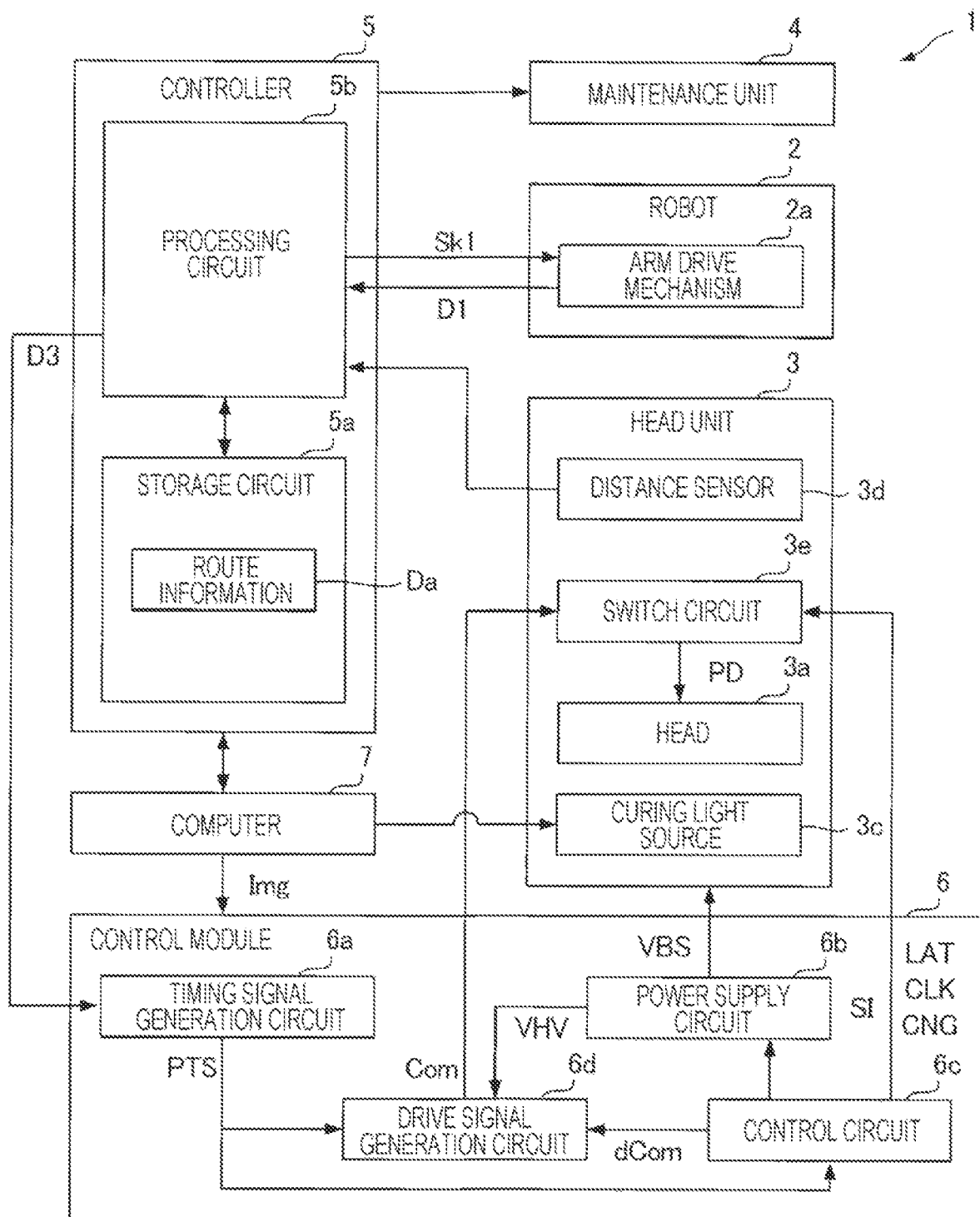
FIG. 2 is a block diagram illustrating an electrical configuration of the three-dimensional object printing apparatus according to the embodiment.

1-2. Electrical Configuration of Three-dimensional Object Printing Apparatus FIG. 2 is a block diagram illustrating an electrical configuration of the three-dimensional object printing apparatus 1 according to the embodiment. In FIG. 2, among components of the three-dimensional object printing apparatus 1, electrical components are illustrated. As illustrated in FIG. 2, in addition to the components illustrated in FIG. 1 described above, the three-dimensional object printing apparatus 1 includes a control module 6 that is communicably connected to the controller 5 and a computer 7 that is communicably connected to the controller 5 and the control module 6 Hereinafter, before the detailed description of the controller 5, the control module 6 and the computer 7 will be described in this order.

Each electrical component illustrated in FIG. 2 may be appropriately divided, a part thereof may be included in another component, or may be integrally formed with the other component. For example, a part or all of functions of the controller 5 or the control module 6 may be realized by the computer 7, or may be realized by another external device such as a personal computer (PC) connected to the controller 5 via a network such as a local area network (LAN) or the Internet.

The controller 5 has a function of controlling the drive of the robot 2 and a function of generating a signal D3 for synchronizing an ink ejection operation of the head unit 3 with the operation of the robot 2. The controller 5 according to the present embodiment also has a function of controlling a drive of the maintenance unit 4, and the function may be realized by another apparatus such as the computer 7.

The controller 5 has a storage circuit 5a and a processing circuit 5b.

The storage circuit 5a stores various programs to be executed by the processing circuit 5b and various types of data to be processed by the processing circuit 5b. The storage circuit 5a includes, for example, one or both semiconductor memories of a volatile memory such as a random access memory (RAM) and a non-volatile memory such as a read only memory (ROM), an electrically erasable programmable read-only memory (EEPROM) or a programmable ROM (PROM). A part or all of the storage circuit 5a may be included in the processing circuit 5b.

Route information Da is stored in the storage circuit 5a. The route information Da is information indicating a route in which the head unit 3 is to be moved and a posture of the head unit 3 in the route. Here, as the information indicating the route and the posture, the route information Da includes information indicating a movement route and a posture of the head unit 3 when printing on the work W, and information indicating a movement route and a posture between a position of the head unit 3 during the printing and a position during maintenance by the maintenance unit 4. The route information Da is determined based on, for example, a shape of the work W, and is expressed by using coordinate values of the base coordinate system or the world coordinate system. The shape of the work W is determined by, for example, computer-aided design (CAD) data illustrating a three-dimensional shape of the work W. The above route information Da is input from the computer 7 to the storage circuit 5a.

The processing circuit 5b controls an operation of the arm drive mechanism 2a of the robot 2 based on the route information Da, and generates the signal D3. The processing circuit 5b includes, for example, one or more processors such as a central processing unit (CPU). The processing circuit 5b may include a programmable logic device such as a field-programmable gate array (FPGA), instead of the CPU or in addition to the CPU.

Here, the arm drive mechanism 2a is an aggregation of the drive mechanisms of the joint portions 230_1 to 230_6 described above, and includes a motor for driving the joint portion of the robot 2 and an encoder that measures a rotation angle of the joint portion of the robot 2, for each joint portion.

The processing circuit 5*b* performs inverse kinematics calculation, which is a calculation for converting the route information Da into a movement amount such as a rotation angle and a rotation speed of each joint of the robot 2. The processing circuit 5*b* outputs a control signal Sk1 based on an output D1 from each encoder of the arm drive mechanism 2*a* so that the movement amount such as the actual rotation angle and rotation speed of each of the joints becomes the above-described calculation result based on the route information Da. The control signal Sk1 controls a drive of the motor of the arm drive mechanism 2*a*. Here, the control signal Sk1 is corrected by the processing circuit 5*b* based on an output from the distance sensor 3*d*, as needed.

Further, the processing circuit 5*b* generates the signal D3, based on the output D1 from at least one of a plurality of encoders of the arm drive mechanism 2*a*. For example, the processing circuit 5*b* generates a trigger signal including a pulse at a timing at which the output D1 from one of the plurality of encoders becomes a predetermined value as the signal D3.

The control module 6 is a circuit that controls the ink ejection operation of the head unit 3, based on the signal D3 output from the controller 5 and print data from the computer 7. The control module 6 includes a timing signal generation circuit 6*a*, a power supply circuit 6*b*, a control circuit 6*c*, and a drive signal generation circuit 6*d*.

The timing signal generation circuit 6*a* generates a timing signal PTS based on the signal D3. The timing signal generation circuit 6*a* is configured with, for example, a timer that starts generation of the timing signal PTS by using detection of the signal D3 as a trigger.

The power supply circuit 6*b* receives power from a commercial power source (not illustrated) to generate various predetermined potentials. The various generated potentials are appropriately supplied to each portion of the control module 6 and the head unit 3. For example, the power supply circuit 6*b* generates a power supply potential VHV and an offset potential VBS. The offset potential VBS is supplied to the head unit 3. Further, the power supply potential VHV is supplied to the drive signal generation circuit 6*d*.

The control circuit 6*c* generates a control signal SI, a waveform designation signal dCom, a latch signal LAT, a clock signal CLK, and a change signal CNG, based on the timing signal PTS. These signals are synchronized with the timing signal PTS. Among these signals, the waveform designation signal dCom is input to the drive signal generation circuit 6*d*, and the other signals are input to the switch circuit 3*e* of the head unit 3.

The control signal SI is a digital signal for designating an operation state of a drive element included in the head 3*a* of the head unit 3. Specifically, the control signal SI designates whether or not to supply a drive signal Com, which will be described below, to the drive element. With this designation, for example, whether or not to eject inks from a nozzle corresponding to the drive element is designated, and the amount of ink ejected from the nozzle is designated. The waveform designation signal dCom is a digital signal for defining a waveform of the drive signal Com. The latch signal LAT and the change signal CNG are used in combination with the control signal SI, and by defining a drive timing of the drive element, an ejection timing of the ink from the nozzle is defined. The clock signal CLK is a reference clock signal synchronized with the timing signal PTS.

The above control circuit 6*c* includes, for example, one or more processors such as a central processing unit (CPU). The control circuit 6*c* may include a programmable logic device such as a field-programmable gate array (FPGA), instead of the CPU or in addition to the CPU.

The drive signal generation circuit 6*d* is a circuit that generates the drive signal Com for driving each drive element included in the head 3*a* of the head unit 3. Specifically, the drive signal generation circuit 6*d* includes, for example, a DA conversion circuit and an amplifier circuit. In the drive signal generation circuit 6*d*, the DA conversion circuit converts the waveform designation signal dCom from the control circuit 6*c* from a digital signal to an analog signal, and the amplifier circuit uses the power supply potential VHV from the power supply circuit 6*b* to amplify the analog signal and generate the drive signal Com. Here, among waveforms included in the drive signal Com, a signal of a waveform actually supplied to the drive element is a drive pulse PD. The drive pulse PD is supplied to the drive element from the drive signal generation circuit 6*d* via the switch circuit 3*e* of the head unit 3.

Here, the switch circuit 3*e* is a circuit that switches whether or not to supply at least a part of the waveform included in the drive signal Com as the drive pulse PD, based on the control signal SI.

The computer 7 has a function of supplying information such as the route information Da to the controller 5, and a function of supplying information such as the print data to the control module 6. The computer 7 is, for example, a desktop computer or a notebook computer in which a program that realizes these functions is installed.

1-3. Head Unit Configuration

Figure 3:
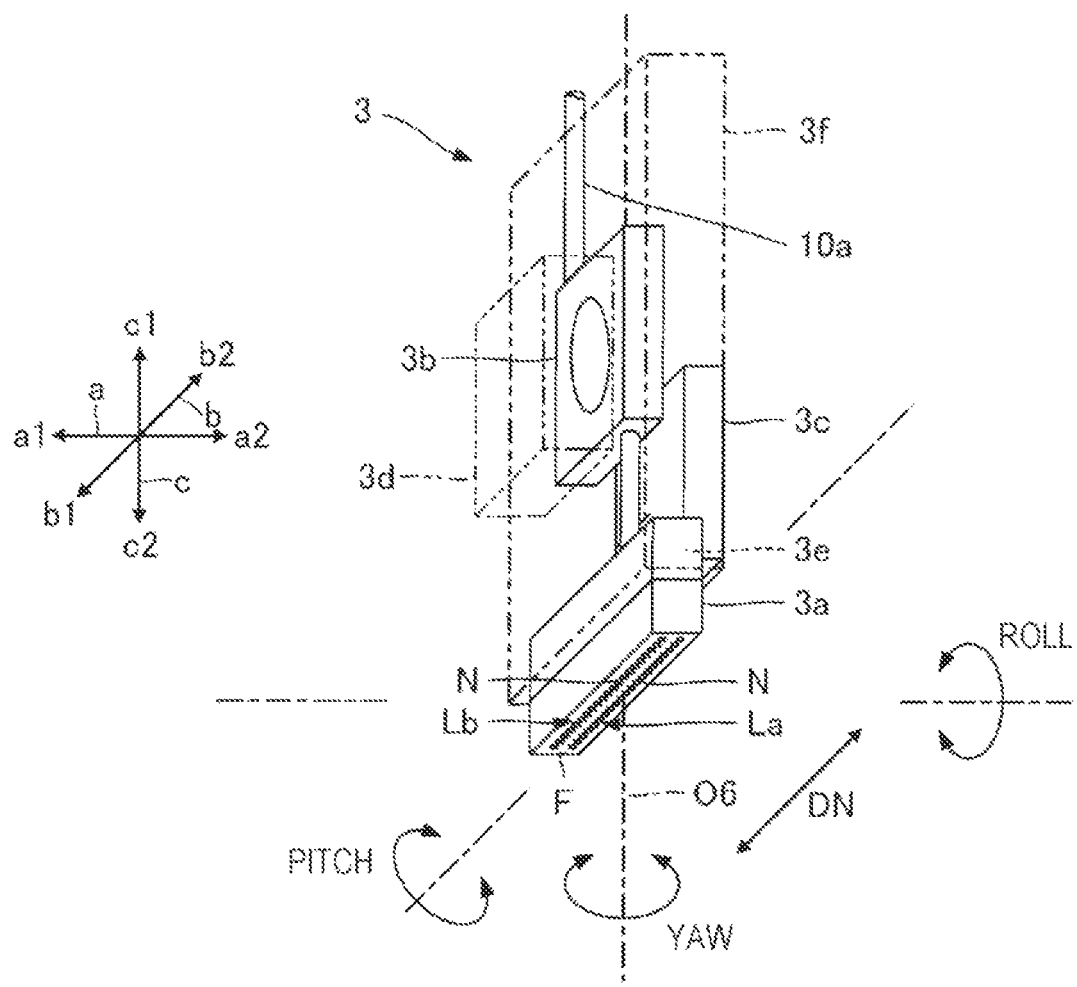
FIG. 3 is a perspective view illustrating a schematic configuration of a head unit including a head.

FIG. 3 is a perspective view illustrating a schematic configuration of the head unit 3 including the head 3*a*. In the following description, for convenience, an a-axis, a b-axis, and a c-axis that intersect with each other will be appropriately used. Further, in the following description, one direction along the a-axis is an a1 direction, and a direction opposite to the a1 direction is an a2 direction. In the same manner, directions opposite to each other along the b-axis are a b1 direction and a b2 direction. Further, directions opposite to each other along the c-axis are a c1 direction and a c2 direction.

Here, the a-axis, the b-axis, and the c-axis correspond to the coordinate axes of a tool coordinate system set in the head unit 3, and relative positions and relationships of postures with the above-described world coordinate system or robot coordinate system are changed by the operation of the above-described robot 2. In the example illustrated in FIG. 3, the c-axis is an axis parallel with the above-described rotation axis O6. The a-axis, the b-axis, and the c-axis are typically orthogonal to each other without being limited thereto, and may intersect at an angle within a range of 80° or more and 100° or less, for example. The tool coordinate system and the base coordinate system or the robot coordinate system are associated with each other by calibration. Further, the tool coordinate system is set so that, for example, a center of the nozzle surface F, which will be described below, serves as a reference (tool center point).

As described above, the head unit 3 includes the head 3*a*, the pressure regulating valve 3*b*, the curing light source 3*c*, and the distance sensor 3*d*. The head 3*a*, the pressure regulating valve 3b, the curing light source 3c, and the distance sensor 3d are supported by a support body 3f illustrated by an alternate long and short dash line in FIG. 3. In the example illustrated in FIG. 3, the number of each of the head 3a and the pressure regulating valve 3b included in the head unit 3 is one without being limited to the example illustrated in FIG. 3, and the number may be equal to or more than 2. Further, an installation position of the pressure regulating valve 3b is not limited to the arm 226, and may be, for example, another arm or the like, or may be a fixed position with respect to the base portion 210.

The support body 3f is made of, for example, a metal material or the like, and is a substantially rigid body. In FIG. 3, the support body 3f has a planar box shape, and a shape of the support body 3f is not particularly limited and is freely determined.

The above support body 3f is attached to the above-described arm 226. Therefore, the head 3a, the pressure regulating valve 3b, the curing light source 3c, and the distance sensor 3d are collectively supported by the arm 226 with the support body 3f. Therefore, a relative position of each of the head 3a, the pressure regulating valve 3b, the curing light source 3c, and the distance sensor 3d with respect to the arm 226 is fixed. In the example illustrated in FIG. 3, the pressure regulating valve 3b is disposed at a position from the head 3a in the c1 direction. The curing light source 3c is disposed at a position from the head 3a in the a2 direction. The distance sensor 3d is disposed at a position from the head 3a in the a1 direction.

The head 3a has the nozzle surface F and a plurality of nozzles N that are opened on the nozzle surface F. In the example illustrated in FIG. 3, a normal direction of the nozzle surface F is the c2 direction, and the plurality of nozzles N are divided into nozzle rows La and nozzle rows Lb which are arranged at intervals along the a-axis. Each of the nozzle row La and the nozzle row Lb is a set of the plurality of nozzles N linearly arranged in a direction along the b-axis. Here, the element related to each nozzle N of the nozzle row La and the element related to each nozzle N of the nozzle row Lb in the head 3a are configured to be substantially symmetrical with each other in a direction along the a-axis. Further, a nozzle row direction DN, which will be described below, is parallel with the b-axis.

The nozzle surface F in the present embodiment has a concept including both a surface formed by a nozzle plate and a surface formed by a fixing plate or a cover head. The nozzle plate is a member in which the nozzle N is opened in a plate-shaped member made of silicon (Si), metal, or the like, and the fixing plate and the cover head are members provided around the nozzle plate for the purpose of fixing or protecting the nozzle plate. The fixing plate and the cover head may not be provided depending on the configuration of the head 3a, and the nozzle surface F illustrated in FIG. 3 is formed only by the nozzle plate.

Meanwhile, positions of the plurality of nozzles N in the nozzle row La and the plurality of nozzles N in the nozzle row Lb in the direction along the b-axis may be the same or different from each other. Further, the element related to each nozzle N of one of the nozzle row La and the nozzle row Lb may be omitted. In the following, a configuration in which the positions of the plurality of nozzles N in the nozzle row La and the plurality of nozzles N in the nozzle row Lb in the direction along the b-axis coincide with each other is exemplified.

Although not illustrated, the head 3a has a piezoelectric element which is a drive element and a cavity for accommodating inks, for each nozzle N. Here, the piezoelectric element ejects an ink from a nozzle corresponding to the cavity by changing a pressure of the cavity corresponding to the piezoelectric element. Such a head 3a can be obtained, for example, by bonding a plurality of substrates such as a silicon substrate appropriately processed by etching or the like with an adhesive or the like. As the drive element for ejecting the ink from the nozzle, a heater that heats the ink in the cavity may be used instead of the piezoelectric element.

As described above, the ink is supplied to the head 3a from an ink tank (not illustrated) via the supply pipe 10a. Here, the pressure regulating valve 3b is interposed between the supply pipe 10a and the head 3a.

The pressure regulating valve 3b is a valve mechanism that is opened and closed according to a pressure of the ink in the head 3a. By this opening and closing, the pressure of the ink in the head 3a is maintained at a negative pressure within a predetermined range even when a positional relationship between the head 3a and the ink tank (not illustrated) described above changes. Therefore, a meniscus of the ink formed at the nozzle N of the head 3a is stabilized. As a result, it is possible to prevent air bubbles from entering the nozzle N, and the ink from overflowing from the nozzle N. Further, the ink from the pressure regulating valve 3b is appropriately distributed to a plurality of locations of the head 3a via a branch flow path (not illustrated). Here, the ink from the ink tank (not illustrated) is transferred into the supply pipe 10a at a predetermined pressure by a pump or the like.

The curing light source 3c emits energy such as light, heat, electron beam, or radiation for curing or solidifying the ink on the work W. For example, when the ink has ultraviolet curability, the curing light source 3c is configured with a light emitting element such as a light emitting diode (LED) that emits ultraviolet rays. Further, the curing light source 3c may appropriately have an optical component such as a lens for adjusting an emission direction or an emission range of energy.

The curing light source 3c may not completely cure or completely solidify the ink on the work W. In this case, for example, the ink after the energy irradiation from the curing light source 3c may be completely cured or completely solidified by the energy from the curing light source separately installed on the installation surface of the base portion 210 of the robot 2. Further, the curing light source 3c may be provided as needed, or may be omitted.

The distance sensor 3d is an optical displacement sensor that measures a distance between the head 3a and the work W. The distance sensor 3d according to the present embodiment outputs a signal according to the distance between the head 3a and the work W in a direction along the c-axis. The distance sensor 3d may be provided as needed or may be omitted.

1-4. Maintenance Unit Configuration

Figure 4:
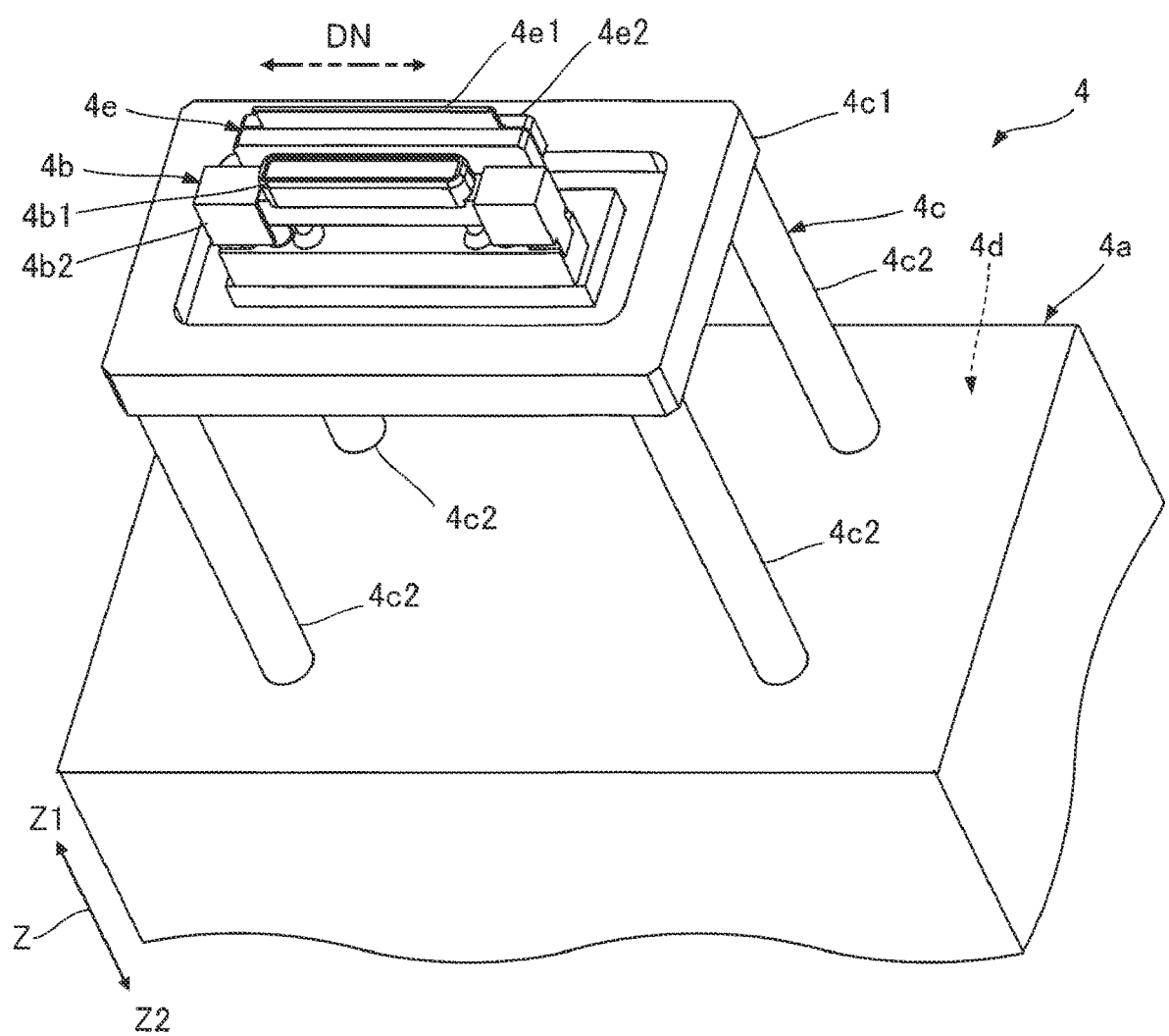
FIG. 4 is a perspective view illustrating a schematic configuration of a maintenance unit including a cap portion.

FIG. 4 is a perspective view illustrating a schematic configuration of the maintenance unit 4 including the cap portion 4b. As described above, the maintenance unit 4 illustrated in FIG. 4 includes the case 4a, the cap portion 4b, the support table 4c, the suction mechanism 4d, and the wiper portion 4e.

The case 4a is a box-shaped structure that supports the cap portion 4b, the support table 4c, the suction mechanism 4d, and the wiper portion 4e. The shape of the case 4a is not limited to the example illustrated in FIG. 4, and is freely determined.

The cap portion 4b is a structure having a cap 4b1 that covers the nozzle surface F of the head 3a, a guide portion 4b2, and a biasing mechanism. In the example illustrated in FIG. 4, the cap portion 4b has a longitudinal shape. The cap 4b1 is an elastic lid made of a rubber material, an elastomer material, or the like, and covers the nozzle surface F of the head 3a to prevent inks in the vicinity of the nozzle N of the head 3a from drying. The cap 4b1 is provided with an outer frame portion that abuts on the nozzle surface F of the head 3a, a bottom surface that is recessed with respect to the outer frame portion in the Z2 direction, and a hole that penetrates the cap 4b1. In a capping operation of covering the nozzle surface F of the head 3a with the cap portion 4b, which will be described below, the outer frame portion abuts on the nozzle surface F of the head 3a so as to surround the nozzle N provided on the nozzle surface F in the horizontal state. At this time, the bottom surface faces the nozzle surface F. The hole has one end open that is opened to the bottom surface of the recess portion and the other end open that is coupled to the suction mechanism 4d.

The biasing mechanism is a mechanism that supports the cap 4b1 and is biased in the Z1 direction, and is configured with an elastic body such as a spring or rubber. The guide portion 4b2 is a member that regulates movement of the cap 4b1 in a direction different from the Z direction. When the nozzle surface F of the head 3a and the above-described outer frame portion come into contact with each other, the elastic body of the biasing mechanism is elastically deformed so as to contract in the Z direction. The biasing mechanism may be a mechanism such as a gas stay.

The above cap portion 4b is supported by the support table 4c. The support table 4c is configured with a top surface portion 4c1 to which the cap portion 4b is fixed, and a plurality of leg portions 4c2 that support the top surface portion 4c1. The top surface portion 4c1 is a plate-shaped member made of a metal material or the like, and the cap portion 4b and the wiper portion 4e are fixed to the top surface portion 4c1 by screwing or the like.

The suction mechanism 4d is a mechanism for reducing a pressure in a space formed between the cap portion 4b and the nozzle surface F. Due to the reduced pressure, an ink is sucked from the nozzle N of the head 3a in a state in which the cap portion 4b covers the nozzle surface F, so that the ink in the nozzle N is refreshed. The suction mechanism 4d has a decompression tank and a decompression pump 4d2 (not illustrated). The decompression tank is, for example, a metal chamber having an internal space for decompression, and is disposed in the case 4a described above. The decompression tank communicates with the hole of the cap portion 4b described above, and also communicates with the decompression pump. The decompression pump is a mechanism for decompressing the inside of the decompression tank by discharging air from the decompression tank. Valves and the like for pressure adjustment or opening and closing are respectively provided between the decompression tank and the cap portion 4b, and between the decompression tank and the decompression pump.

The wiper portion 4e is a structure that is disposed at a position adjacent to the cap portion 4b, and has a wiper 4e1 that wipes the nozzle surface F. In the example illustrated in FIG. 4, the wiper portion 4e has a longitudinal shape, and is disposed to be parallel with the cap portion 4b. The wiper 4e1 is an elastic blade-shaped member made of a rubber material, an elastomer material, or the like, and cleans the nozzle surface F by wiping the nozzle surface F of the head 3a. The wiper 4e1 is fixed to the top surface portion 4c1 of the support table 4c via the support body 4e2 by screwing or the like.

1-5. Operation of Three-dimensional Object Printing Apparatus

Figure 5:
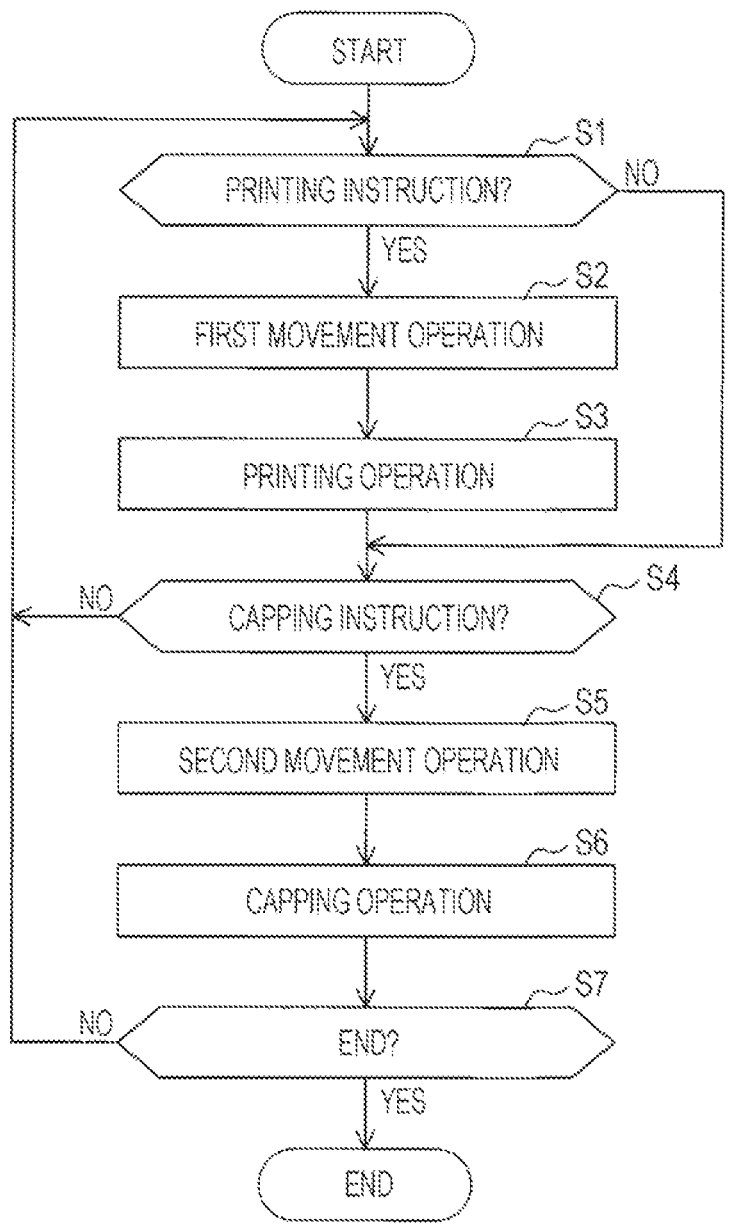
FIG. 5 is a flowchart illustrating an operation of the three-dimensional object printing apparatus according to the embodiment.

FIG. 5 is a flowchart illustrating an operation of the three-dimensional object printing apparatus 1 according to the embodiment. First, as illustrated in FIG. 5, the three-dimensional object printing apparatus 1 determines whether or not there is a printing instruction, in step S1. For example, for this determination, the processing circuit 5b determines whether or not the computer 7 instructs printing execution.

When the printing instruction is given, the three-dimensional object printing apparatus 1 performs a first movement operation in step S2. This first movement operation is an operation of moving the head 3a to an execution start position of the printing operation, which will be described below, and is performed by the processing circuit 5b controlling the drive of the robot 2 based on the route information Da.

After step S2, the three-dimensional object printing apparatus 1 performs the printing operation in step S3. This printing operation is an operation of printing on the work W with inks from the head 3a, and is performed by the processing circuit 5b controlling the drive of the robot 2 based on the route information Da, and the control module 6 controlling the drive of the head 3a.

After step S3, or when there is no printing instruction, the three-dimensional object printing apparatus 1 determines whether or not there is a cap instruction, in step S4. For example, for this determination, the processing circuit 5b determines whether or not there is the cap instruction from the computer 7. When the printing instruction and the cap instruction are not given from the computer 7 for a predetermined time or more, the processing circuit 5b may determine that the cap instruction is given.

When there is no cap instruction, the three-dimensional object printing apparatus 1 returns to step S1 described above. On the other hand, when there is the cap instruction, the three-dimensional object printing apparatus 1 performs a second movement operation in step S5. This second movement operation is an operation of moving the head 3a to an execution start position of a capping operation, which will be described below, and is performed by the processing circuit 5b controlling the drive of the robot 2 based on the route information Da.

After step S5, the three-dimensional object printing apparatus 1 performs the capping operation in step S6. This capping operation is, for example, an operation in which the nozzle surface F of the head 3a and the cap portion 4b come into contact with each other to cover the nozzle surface F with the cap portion, and is performed by the processing circuit 5b controlling the drive of the robot 2 based on the route information Da. The capping operation may include an operation in which the nozzle surface F and the cap portion 4b do not strictly contact each other. For example, this case corresponds to a case where the nozzle surface F and the cap portion 4b are separated by several millimeters, or a case where an ink or the like is interposed between the nozzle surface F and the cap portion 4b.

After step S6, the three-dimensional object printing apparatus 1 determines whether or not there is an end instruction, in step S7. For example, for this determination, the processing circuit 5b determines whether or not there is an end instruction from the computer 7.

When there is no end instruction, the three-dimensional object printing apparatus 1 returns to step S1 described above, and on the other hand, when there is the end instruction, the three-dimensional object printing apparatus 1 ends the operation.

Figure 6:
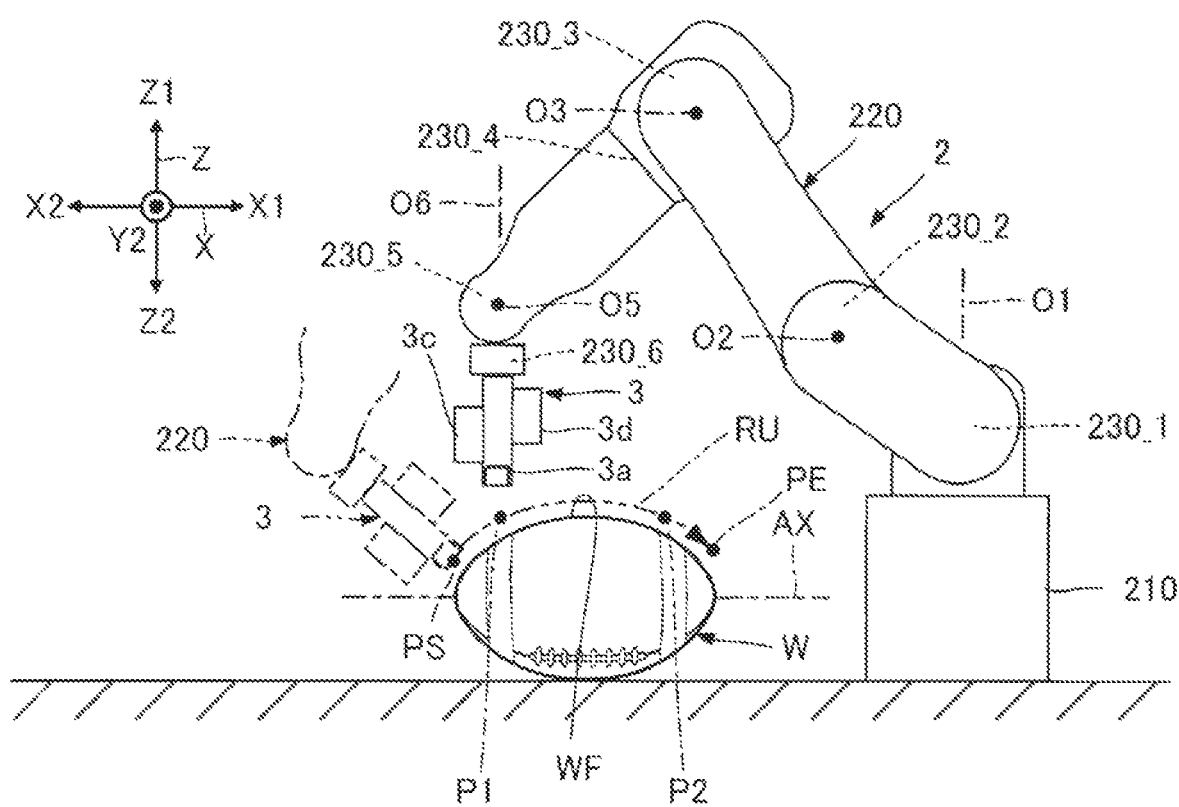
FIG. 6 is a side view of a robot during execution of a printing operation.

FIG. 6 is a side view of the robot 2 during execution of a printing operation in step S3. FIG. 6 illustrates a case where printing is performed on the surface WF of the work W disposed so that a long axis AX of the work W having a long spherical shape is parallel with the X-axis. Here, the work W is placed at a position from the robot 2 in the X2 direction. At a posture of the head 3a illustrated by the solid line in FIG. 6, the a-axis and the X-axis are parallel, the b-axis and the Y-axis are parallel, and the c-axis and the Z-axis are parallel.

In the printing operation, as illustrated in FIG. 6, the robot 2 moves the head 3a along a movement route RU. The movement route RU is a route from a position PS to a position PE along the surface WF. The movement route RU has a linear shape extending along the X-axis when viewed in the Z2 direction.

In the printing operation, the robot 2 operates the three joint portions 230 among the six joint portions 230. In the example illustrated in FIG. 6, the robot 2 sets a rotation axis of each of the joint portion 230_2, the joint portion 230_3, and the joint portion 230_5 to a state of being parallel with the Y-axis during the execution of the printing operation, and operates these joint portions. In this manner, the head 3a can be stably moved along the movement route RU by the operation of the three joint portions 230.

Here, it is preferable that the robot 2 controls the posture of the head 3a according to a curved surface of the surface WF so that a landing direction of the ink from the head 3a on the surface WF is constant. Therefore, it is preferable that a yaw angle and a roll angle of the head 3a in the movement route RU are constant. On the other hand, a pitch angle of the head 3a in the movement route RU is preferably changed. That is, it is preferable that the pitch angles of the heads 3a at the first position P1 and the second position P2, which are any two points in the movement route RU, are different from each other. In the present embodiment, the movement route RU is set so that an ejection direction vector of the ink droplets ejected by the head 3a always includes a vertically downward component. In other words, a vector in the c2 direction includes a component in the Z2 direction. According to the setting of the movement route RU, the head 3a does not eject the ink droplets in a direction against gravity, so that the ink droplets fly stably.

The printing is performed on the work W by the above printing operation.

Here, the yaw angle, the roll angle, and the pitch angle of the head 3a will be described. The yaw angle, the roll angle, and the pitch angle of the head 3a are expressed as the amount of rotation around the c-axis, the a-axis, and the b-axis based on a reference posture of the head 3a set in any manner. At the reference posture of the head 3a, relationships between the a-axis, b-axis, and c-axis and the X-axis, Y-axis, and Z-axis are uniquely fixed.

The yaw angle of the head 3a at a first posture of the head 3a is expressed as the amount of rotation around the c-axis required for a posture change from the reference posture to the first posture. The amount of rotation around the c-axis is an absolute value of an angle formed by the a-axis at the reference posture and the a-axis at the first posture when viewed in a direction along the c-axis at the reference posture. Alternatively, the amount of rotation around the c-axis is an absolute value of an angle formed by the b-axis at the reference posture and the b-axis at the first posture when viewed in the direction along the c-axis at the reference posture.

In the same manner, the roll angle of the head 3a at the first posture of the head 3a is expressed as the amount of rotation around the a-axis required for the posture change from the reference posture to the first posture. The amount of rotation around the a-axis is an absolute value of an angle formed by the b-axis at the reference posture and the b-axis at the first posture when viewed in a direction along the a-axis at the reference posture. Alternatively, the amount of rotation around the a-axis is an absolute value of an angle formed by the c-axis at the reference posture and the c-axis at the first posture when viewed in the direction along the a-axis at the reference posture.

In the same manner, the pitch angle of the head 3a at the first posture of the head 3a is expressed as the amount of rotation around the b-axis required for the posture change from the reference posture to the first posture. The amount of rotation around the b-axis is an absolute value of an angle formed by the a-axis at the reference posture and the a-axis at the first posture when viewed in a direction along the b-axis at the reference posture. Alternatively, the amount of rotation around the b-axis is an absolute value of an angle formed by the c-axis at the reference posture and the c-axis at the first posture when viewed in the direction along the b-axis at the reference posture.

The yaw angle, the roll angle, and the pitch angle of the head 3a will be further described with reference to FIG. 6. For example, the reference posture of the head 3a is set as a posture at which the a-axis and the X-axis are parallel, the b-axis and the Y-axis are parallel, and the c-axis and the Z-axis are parallel. At this time, all the yaw angle, the roll angle, and the pitch angle of the head 3a illustrated by a solid line in FIG. 6 are 0°. On the other hand, the pitch angle of the head 3a illustrated by a broken line in FIG. 6 is approximately 45°, and the yaw angle and the roll angle are 0°. That is, the head 3a illustrated by the solid line and the head 3a illustrated by the broken line in FIG. 6 have different pitch angles.

Figure 7:
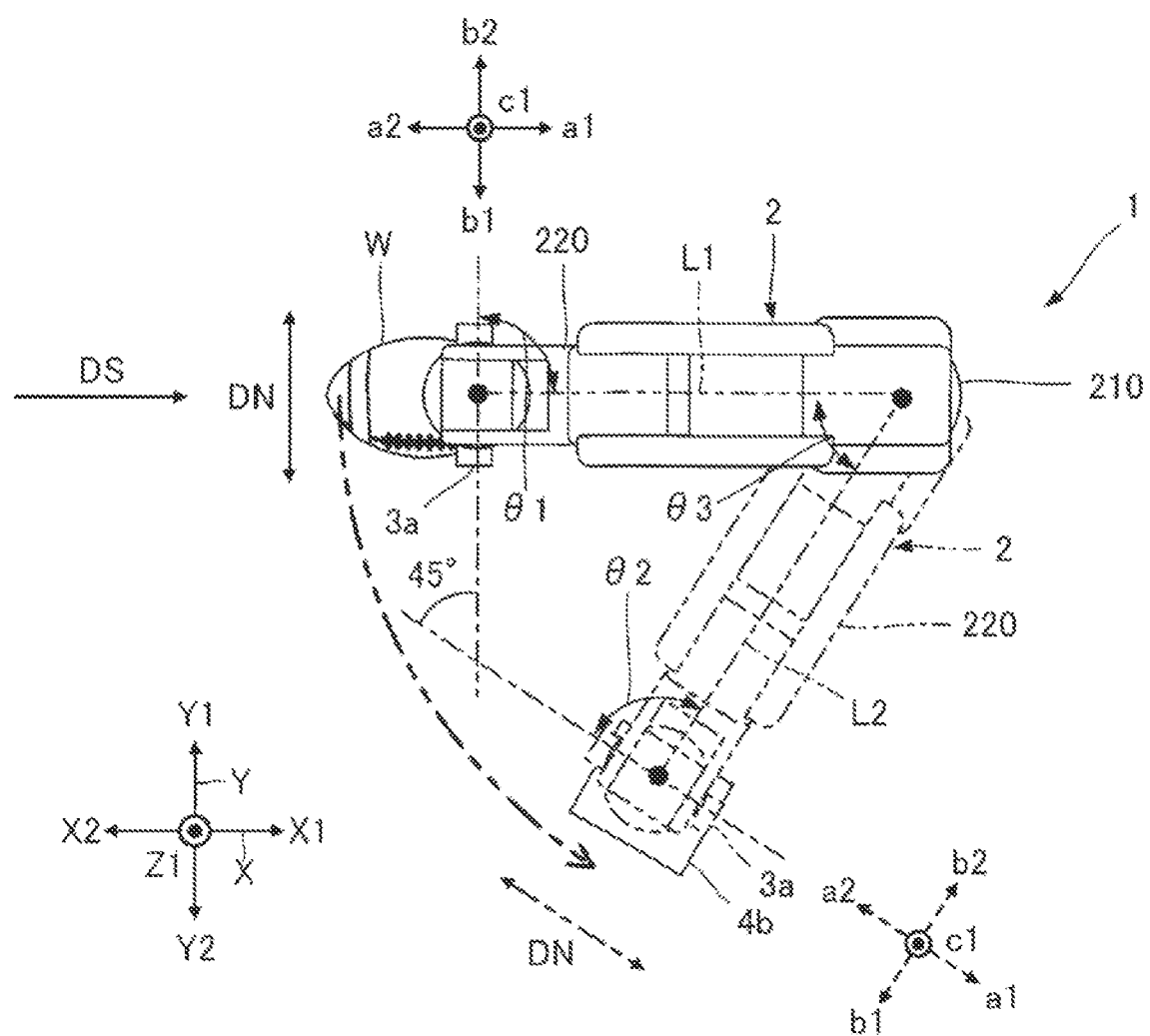
FIG. 7 is a plan view of the three-dimensional object printing apparatus during execution of the printing operation.

FIG. 7 is a plan view of the three-dimensional object printing apparatus 1 during execution of the printing operation. In a posture of the head 3a illustrated by the solid line in FIG. 7, the a-axis and the X-axis are parallel, the b-axis and the Y-axis are parallel, and the c-axis and the Z-axis are parallel. During the execution of the printing operation, as illustrated in FIG. 7, in the plan view of the base portion 210, the nozzle row direction DN which is an arrangement direction of the plurality of nozzles N of the head 3a is orthogonal to a scanning direction DS of the head 3a in the above-described movement route RU. Here, when the virtual line segment coupling the head 3a and the base portion 210 during the execution of the printing operation in the plan view of the base portion 210 is defined as a first line segment L1, an angle θ1 formed by the nozzle row direction DN and a first line segment L1 is 90°. Meanwhile, the angle θ1 is not limited to 90°, and may be, for example, in a range equal to or more than 70° and equal to or less than 110°. The first line segment L1 can be more strictly defined as a virtual line segment coupling a center point of the nozzle surface F and the rotation axis O1 during execution of a printing operation in the plan view of the base portion 210.

After executing the printing operation, the head 3a moves onto the cap portion 4b by the second movement operation described above, as illustrated by an alternate long and short dash line in FIG. 7. At the posture of the head 3a illustrated by the alternate long and short dash line in FIG. 7, the c-axis and the Z-axis are parallel, and an angle formed by the a-axis and the X-axis is 45° and an angle formed by the b-axis and the Y-axis is 45°.

Here, the reference posture of the head 3a is set as a posture at which the a-axis and the X-axis are parallel, the b-axis and the Y-axis are parallel, and the c-axis and the Z-axis are parallel. At this time, the yaw angle, the roll angle, and the pitch angle of the head 3a illustrated by a solid line in FIG. 7 are all 0°. On the other hand, the yaw angle of the head 3a illustrated by the alternate long and short dash line in FIG. 7 is 45°, and the roll angle and pitch angle are 0°. That is, the yaw angle of the head 3a illustrated by the solid line and the head 3a illustrated by the alternate long and short dash line in FIG. 7 is different from each other. In other words, the nozzle row direction DN of the nozzles N when viewed from any coordinate in the world coordinate system in the Z1 direction differs during the execution of the printing operation and after the execution of the movement operation or during the execution of the capping operation. More specifically, an angle formed by the nozzle row direction DN during the printing operation and the nozzle row direction DN after the movement operation or the capping operation is executed is 45°.

The second movement operation is mainly performed by operating the joint portion 230_1. Here, the joint portion 230_2, the joint portion 230_3, and the joint portion 230_5 used in the above-described printing operation may be operated, and it is preferable not to operate the joint portion 230_4 and the joint portion 230_6. In this case, when the printing operation is performed again, reproducibility of the operation of the robot 2 in the printing operation can be improved.

Figure 8:
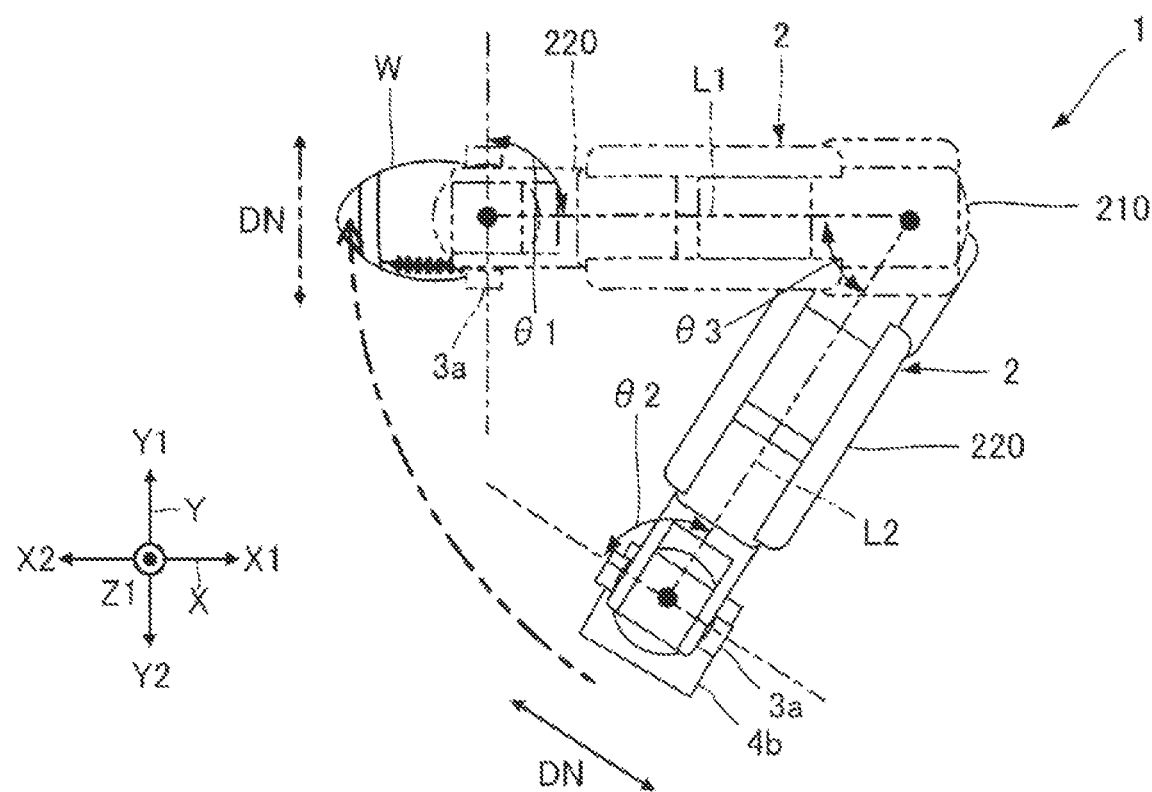
FIG. 8 is a plan view of the three-dimensional object printing apparatus during execution of a capping operation.

FIG. 8 is a plan view of the three-dimensional object printing apparatus 1 during execution of a capping operation. As illustrated in FIG. 8, when a virtual line segment coupling the head 3a and the base portion 210 during the execution of the capping operation in the plan view of the base portion 210 is defined as a second line segment L2, an angle θ2 formed by the nozzle row direction DN and the second line segment L2 is 90°. Meanwhile, the angle θ2 is not limited to 90°, and may be, for example, in a range equal to or more than 70° and equal to or less than 110°. The second line segment L2 can be more strictly defined as a virtual line segment coupling the center point of the nozzle surface F during execution of the capping operation and the rotation axis O1 in the plan view of the base portion 210.

Here, when an angle formed by the first line segment L1 and the second line segment L2 in the plan view of the base portion 210 is θ3, the angles θ1, θ2, and θ3 satisfy a relationship of |θ1−θ2|<θ3. Further, from the viewpoint of reducing twisting of the piping portion 10 and the wiring portion 11, |θ1−θ2| is preferably as small as possible.

After executing the capping operation, the head 3a moves to the above-described printing position by the above-described first movement operation as illustrated by an alternate long and short dash line in FIG. 8. The first movement operation is mainly performed by operating the joint portion 230_1, in the same manner as the second movement operation.

As described above, the three-dimensional object printing apparatus 1 has the head 3a, the robot 2, and the cap portion 4b. The head 3a has the nozzle surface F at which the plurality of nozzles N for ejecting an ink, which is an example of a "liquid" are provided. The robot 2 includes the base portion 210, and the arm portion 220 that supports the head 3a, and the joint portions 230_2 to 230_6, which are examples of a "plurality of rotating portions", are provided from the base portion 210 to the arm portion 220 to change a position of the head 3a with respect to the base portion 210 by rotation of the joint portions 230_2 to 230_6. The cap portion 4b covers the nozzle surface F.

As described above, the three-dimensional object printing apparatus 1 executes the capping operation in step S6 and the printing operation in step S3 as described above. In the capping operation in step S6, the robot 2 locates the head 3a at a position at which the nozzle surface F is covered with the cap portion 4b. In the printing operation in step S3, the head 3a ejects inks to the work W while the robot 2 changes the position of the head 3a with respect to the work W at a position different from the position during the execution of the capping operation in step S6. Here, the yaw angle of the head 3a during the execution of the capping operation in step S6 and the yaw angle of the head 3a during the execution of the printing operation in step S3 are different from each other.

In the above three-dimensional object printing apparatus 1, since the nozzle surface F is covered with the cap portion 4b during the execution of the capping operation in step S6, it is possible to reduce thickening or solidification of the ink on the nozzle surface F even when the printing operation in step S3 is not executed for a long period of time. As a result, clogging of each nozzle N due to the ink can be reduced. Further, by making the yaw angles of the head 3a different from each other between the execution of the capping operation in step S6 and the execution of the printing operation in step S3, the amount of rotation of the joint portion 230_6 closest to the head 3a among a plurality of joint portions 230 of the robot 2 can be reduced when the head 3a is moved between the execution positions of these operations. As a result, damage due to twisting of the wiring or the like related to the head 3a can be reduced.

Here, the three-dimensional object printing apparatus 1 further includes the supply pipe 10a for supplying inks to the head 3a, and the drive wiring 11a for supplying an electrical signal for driving the head 3a to the head 3a. Each of the supply pipe 10a and the drive wiring 11a is provided outside the arm portion 220. When the printing operation in step S3 and the capping operation in step S6 are repeatedly executed while maintaining the yaw angle of the head 3a constant, each of the supply pipe 10a and the drive wiring 11a may be damaged by twisting. Therefore, when such a supply pipe 10a or a drive wiring 11a is used, the above-described effect by making the yaw angle of the head 3a different from each other between the printing operation in step S3 and the capping operation in step S6 becomes remarkable.

Further, from the viewpoint of reducing damage due to twisting of the wiring, as described above, in the plan view of the base portion 210, when an angle formed by the first line segment L1 and the nozzle row direction DN during the execution of the printing operation in step S3 is defined as θ1, an angle formed by the second line segment L2 and the nozzle row direction DN during the execution of the capping operation in step S6 is defined as θ2, and an angle formed by the first line segment L1 and the second line segment L2 is defined as θ3, it is preferable to satisfy a relationship of |θ1−θ2|<θ3. Here, the nozzle row direction DN is an arrangement direction of the plurality of nozzles N, in the plan view of the base portion 210. The first line segment L1 is a virtual line segment coupling the head 3a and the base portion 210 during execution of the printing operation in step S3, in the plan view of the base portion 210. The second line segment L2 is a virtual line segment coupling the head 3a and the base portion 210 during execution of the capping operation in step S6, in the plan view of the base portion 210.

When the angles θ1, θ2, and θ3 satisfy the above-described relationship, as compared with a case where the yaw angles of the head 3a are equal to each other during the execution of the capping operation in step S6 and the execution of the printing operation in step S3, the amount of rotation of the joint portion 230_6 can be reduced when the head 3a is moved between execution positions of the capping operation in step S6 and the printing operation in step S3.

In the three-dimensional object printing apparatus 1, when the two positions through which the head 3a passes during the execution of the printing operation in step S3 are set as the first position P1 and the second position P2, it is preferable that the pitch angle at the first position P1 and the pitch angle at the second position P2 of the head 3a are different from each other. In this case, even when the printing surface of the work W is a curved surface or the like, the posture of the head 3a with respect to the target portion of the printing surface can be kept constant. Therefore, there is an advantage that the image quality can be easily improved regardless of the shape of the printing surface of the work W.

Here, the printing operation in step S3 preferably includes an operation of changing the position of the head 3a with respect to the work W while maintaining the yaw angle and the roll angle of the head 3a to be constant. In this case, it is possible to reduce unevenness of a density of the ink ejected from the head 3a to the work W during the execution of the printing operation in step S3. As a result, there is an advantage that the image quality can be easily improved.

Further, the three-dimensional object printing apparatus 1 further executes the first movement operation in step S2, as described above. In the first movement operation in step S2, the robot 2 moves the head 3a within a period from an execution end of the capping operation in step S6 to an execution start of the printing operation in step S3. Therefore, with the first movement operation in step S2, the capping operation in step S6 can be shifted to the printing operation in step S3.

In addition, the amount of rotation of the joint portion 230_6 over an execution period of the first movement operation in step S2 is smaller than the amount of rotation of the joint portion 230_1 over the execution period of the first movement operation in step S2. Here, the joint portion 230_1 is an example of a "first joint portion", and is the joint portion 230 closest to the base portion 210 among the plurality of joint portions 230. The joint portion 230_6 is an example of a "second joint portion", and is the joint portion 230 farthest from the base portion 210 among the plurality of joint portions 230. When the joint portion 230_6 rotates, the wiring or the like such as the supply pipe 10a and the drive wiring 11a related to the head 3a is more likely to be twisted than when the joint portion 230_1 rotates. Therefore, by making the amount of rotation of the joint portion 230_6 over the execution period of the first movement operation in step S2 smaller than that of the joint portion 230_1 over the execution period of the first movement operation in step S2, it is possible to reduce twisting of the wiring or the like in the first movement operation in step S2.

Further, the three-dimensional object printing apparatus 1 further executes the second movement operation in step S5, as described above. In the second movement operation in step S5, the robot 2 moves the head 3a within a period from an execution end of the printing operation in step S3 to an execution start of the capping operation in step S6. Therefore, with the second movement operation in step S5, the printing operation in step S3 is shifted to the capping operation in step S6.

In addition, the amount of rotation of the joint portion 230_6 over an execution period of the second movement operation in step S5 is smaller than the amount of rotation of the joint portion 230_1 over the execution period of the second movement operation in step S5. Therefore, it is possible to reduce twisting of the wiring or the like in the second movement operation in step S5, in the same manner as the first movement operation in step S2 described above.

A change in yaw angle of the head 3a over the execution period of the first movement operation in step S2 or the second movement operation in step S5 is equal to or more than preferably 45°, and more preferably equal to or more than 90°. As the change in yaw angle increases, a position of the head unit 3 during the execution of the capping operation in step S6 and a position of the work W during the execution of the printing operation in step S3 are separated from each other. Therefore, when performing an operation such as placing or removing the work W, or adjusting the position of the work W during the execution of the capping operation, it is possible to prevent the head unit 3 from interfering with this operation.

Further, as described above, at the execution end of the capping operation in step S6, the head 3a is separated from the cap portion 4b along a normal direction of the nozzle surface F. Therefore, at the execution end of the capping operation in step S6, the nozzle surface F is less likely to move while being in contact with the cap portion 4b, so that dirt on the nozzle surface F due to the ink adhering to the cap portion 4b is prevented.

From the same viewpoint, as described above, at the execution start of the capping operation in step S6, the head 3a approaches the cap portion 4b along the normal direction of the nozzle surface F. Therefore, at the execution start of the capping operation in step S6, the nozzle surface F is less likely to move while being in contact with the cap portion 4b, so that dirt on the nozzle surface F due to the ink adhering to the cap portion 4b is prevented.

Further, as described above, it is preferable that the nozzle surface F during the execution of the capping operation in step S6 is horizontal. In this case, since a meniscus of the ink in each nozzle N is stabilized during the execution of the capping operation in step S6, the ink in the vicinity of each nozzle N is unlikely to thicken, as compared with a case where the nozzle surface F is inclined to the horizontal plane.

As described above, the three-dimensional object printing apparatus 1 according to the present embodiment further includes the biasing mechanism. The biasing mechanism biases the cap portion 4b toward the nozzle surface F during the execution of the capping operation in step S6. Therefore, the cap portion 4b and the nozzle surface F during the execution of the capping operation in step S6 can be stably brought into close contact with each other.

Further, the three-dimensional object printing apparatus 1 according to the present embodiment further has the suction mechanism 4d, as described above. The suction mechanism 4d depressurizes the space formed between the cap portion 4b and the nozzle surface F during the execution of the capping operation in step S6. Therefore, thickened or solidified inks in the vicinity of the nozzle N can be removed by the action of the suction mechanism 4d.

Further, the three-dimensional object printing apparatus 1 according to the present embodiment further includes the wiper portion 4e, as described above. The wiper portion 4e is disposed at a position adjacent to the cap portion 4b, and wipes the nozzle surface F. Therefore, inks adhering to the nozzle surface F can be removed by the action of the wiper portion 4e. In particular, since the wiper portion 4e is disposed at a position adjacent to the cap portion 4b, it is possible to effectively perform maintenance using both the cap portion 4b and the wiper portion 4e.

2. Modification Example

Each form in the above examples can be variously modified. Specific modification aspects that can be applied to each of the above-described forms are illustrated below. The two or more aspects freely selected from the following examples can be appropriately merged within a range not mutually contradictory.

2-1. Modification Example 1

In the above-described embodiment, a configuration using a 6-axis vertical multi-axis robot as a robot is exemplified, and the configuration is not limited to this configuration. The robot may be, for example, a vertical multi-axis robot other than the 6-axis robot, or a horizontal multi-axis robot. Further, the arm portion of the robot may have a telescopic mechanism or the like, in addition to the rotating portion configured with the rotating mechanism. Meanwhile, from the viewpoint of the balance between the print quality in the printing operation and the degree of freedom of the robot operation in the non-printing operation, the robot is preferably a multi-axis robot having 6 axes or more.

2-2. Modification Example 2

In the above-described embodiment, a configuration using screwing or the like as a method of fixing the head to the robot is exemplified, and the configuration is not limited to this configuration. For example, the head may be fixed to the robot by gripping the head with a gripping mechanism such as a hand mounted as an end effector of the robot.

2-3. Modification Example 3

In the above-described embodiment, a configuration in which printing is performed by using one type of ink is exemplified. Meanwhile, the configuration is not limited to this configuration, and the present disclosure can be applied to a configuration in which printing is performed by using two or more types of ink.

2-4. Modification Example 4

The application of the three-dimensional object printing apparatus of the present disclosure is not limited to printing. For example, a three-dimensional object printing apparatus that ejects a solution of a coloring material is used as a manufacturing apparatus of forming a color filter of a liquid crystal display apparatus. Further, a three-dimensional object printing apparatus that ejects a solution of a conductive material is used as a manufacturing apparatus of forming wirings or electrodes on a wiring substrate. In addition, the three-dimensional object printing apparatus can also be used as a jet dispenser of applying a liquid such as an adhesive to a work.

What is claimed is:

1. A three-dimensional object printing apparatus comprising:
   a head having a nozzle surface provided with a plurality of nozzles for ejecting a liquid;
   a robot that has a base portion and an arm portion that supports the head, is provided with a plurality of rotating portions from the base portion to the arm portion, and changes a position of the head with respect to the base portion by rotating one of the plurality of rotating portions;
   a cap portion that covers the nozzle surface; and
   a controller configured to execute:
      a capping operation in which the controller causes the robot to locate the head at a first position at which the nozzle surface is covered with the cap portion; and
      a printing operation in which the controller causes the robot to change a position of the head with respect to a work at a second position while the head ejects the liquid to the work, wherein
   when a first axis is along a direction perpendicular to an installation surface of the base portion, a second axis is perpendicular to the first axis, a third axis is perpendicular to the first axis and the second axis, and a yaw angle of the head is an amount of rotation around the first axis from a reference posture of the head,
   an amount of the yaw angle of the head during the execution of the capping operation and an amount of the yaw angle of the head during the execution of the printing operation are different from each other.

2. The three-dimensional object printing apparatus according to claim 1, wherein
   when two positions through which the head passes during the execution of the printing operation are defined as third position and a fourth position and a pitch angle of the head is an amount of rotation around the second axis from the reference posture of the head,
   an amount of the pitch angle of the head at the third position and an amount of the pitch angle of the head at the fourth position are different from each other.

3. The three-dimensional object printing apparatus according to claim 1, wherein
   when a roll angle of the head is an amount of rotation around the third axis from the reference posture of the head,
   the printing operation includes that the controller changes the position of the head with respect to the work while maintaining the amount of the yaw angle and the roll angle of the head to be constant.

4. The three-dimensional object printing apparatus according to claim 1, wherein
   |θ1−θ2|<θ3, in a plan view of the base portion,
   when an arrangement direction of the plurality of nozzles is defined as a nozzle row direction,
   a virtual line segment coupling the head and the base portion during the execution of the printing operation is defined as a first line segment,
   an angle formed by the first line segment and the nozzle row direction during the execution of the printing operation is defined as θ1,
   a virtual line segment coupling the head and the base portion during the execution of the capping operation is defined as a second line segment,
   an angle formed by the second line segment and the nozzle row direction during the execution of the capping operation is defined as θ2, and
   an angle formed by the first line segment and the second line segment is θ3.

5. The three-dimensional object printing apparatus according to claim 1, wherein the controller is further configured to execute:
  a first movement operation in which the controller causes the robot to move the head within a period from an execution end of the capping operation to an execution start of the printing operation, and
when among the plurality of rotating portions,
a rotating portion closest to the base portion is defined as a first rotating portion, and
a rotating portion farthest from the base portion is defined as a second rotating portion,
an amount of rotation of the second rotating portion over an execution period of the first movement operation is smaller than an amount of rotation of the first rotating portion over the execution period of the first movement operation.

6. The three-dimensional object printing apparatus according to claim 5, wherein
the controller is further configured to execute:
  a second movement operation in which the controller causes the robot to move the head within a period from an execution end of the printing operation to an execution start of the capping operation, and
an amount of rotation of the second rotating portion over an execution period of the second movement operation is smaller than an amount of rotation of the first rotating portion over the execution period of the second movement operation.

7. The three-dimensional object printing apparatus according to claim 6, wherein
a change of the yaw angle of the head over the execution period of the first movement operation or the second movement operation is equal to or more than 45°.

8. The three-dimensional object printing apparatus according to claim 7, wherein
the change of the yaw angle of the head over the execution period of the first movement operation or the second movement operation is equal to or more than 90°.

9. The three-dimensional object printing apparatus according to claim 1, wherein
at an execution end of the capping operation, the head is separated from the cap portion along a normal direction of the nozzle surface.

10. The three-dimensional object printing apparatus according to claim 1, wherein
at an execution start of the capping operation, the head approaches the cap portion along a normal direction of the nozzle surface.

11. The three-dimensional object printing apparatus according to claim 1, wherein
the nozzle surface during the execution of the capping operation is horizontal.

12. The three-dimensional object printing apparatus according to claim 1, wherein
the cap portion is biased toward the nozzle surface during the execution of the capping operation.

13. The three-dimensional object printing apparatus according to claim 1, further comprising:
a suction mechanism that depressurizes a space formed between the cap portion and the nozzle surface during the execution of the capping operation.

14. The three-dimensional object printing apparatus according to claim 1, further comprising:
a wiper portion that is disposed at a position adjacent to the cap portion, and wipes the nozzle surface.

15. The three-dimensional object printing apparatus according to claim 1, further comprising:
a supply pipe that supplies the liquid to the head, wherein the supply pipe is provided outside the arm portion.

16. The three-dimensional object printing apparatus according to claim 1, further comprising:
a drive wiring that supplies an electrical signal for driving the head to the head, wherein
the drive wiring is provided outside the arm portion.

17. The three-dimensional object printing apparatus according to claim 1, wherein
when a pitch angle of the head is an amount of rotation around the second axis from the reference posture of the head and a roll angle of the head is an amount of rotation around the third axis from the reference posture of the head,
an amount of the pitch angle of the head at the first position is equal to an amount of the pitch angle of the head at the second position,
an amount of the roll angle of the head at the first position is equal to an amount of the roll angle at the second position.

18. The three-dimensional object printing apparatus according to claim 1, wherein
the first axis is along a vertical axis, and
the nozzle surface during the execution of the capping operation is perpendicular to the first axis.

19. A three-dimensional object printing method using a head having a nozzle surface provided with a plurality of nozzles for ejecting a liquid, a robot that has a base portion and an arm portion that supports the head, is provided with a plurality of rotating portions from the base portion to the arm portion, and changes a position of the head with respect to the base portion by rotating one of the plurality of rotating portions, and a cap portion that covers the nozzle surface, the method comprising:
performing a capping operation of causing the robot to locate the head at a first position at which the nozzle surface is covered with the cap portion; and
performing a printing operation of causing the robot to change a position of the head with respect to a work at a second position while the head ejects the liquid to the work, wherein
when a first axis is along a direction perpendicular to an installation surface of the base portion, a second axis is perpendicular to the first axis, a third axis is perpendicular to the first axis and the second axis, and a yaw angle of the head is an amount of rotation around the first axis from a reference posture of the head,
an amount of the yaw angle of the head during the execution of the capping operation and an amount of the yaw angle of the head during the execution of the printing operation are different from each other.

* * * * *